United States Patent [19]
Rudd et al.

[11] Patent Number: 4,880,695
[45] Date of Patent: Nov. 14, 1989

[54] MOISTURE-RESISTANT, COATED THERMOPLASTIC FILM HAVING ENHANCED ADHESION TO INKS AND METALLIC LAYERS

[75] Inventors: David Rudd, Naples, N.C.; R. Scott Caines, Greenville, S.C.

[73] Assignee: Hoechst Celanese Corporation, Somerville, N.J.

[21] Appl. No.: 116,106

[22] Filed: Nov. 3, 1987

[51] Int. Cl.$^4$ .................. B32B 7/04; B32B 27/06; B32B 27/36; B32B 31/06
[52] U.S. Cl. .................. 428/341; 428/411.1; 428/420; 428/480
[58] Field of Search .................. 428/480, 195, 411.1, 428/457, 420, 341

[56] References Cited

U.S. PATENT DOCUMENTS

| | | | |
|---|---|---|---|
| 4,486,483 | 12/1984 | Caines | 428/195 |
| 4,554,200 | 11/1985 | Caines | 428/480 |
| 4,775,593 | 10/1988 | Heberger et al. | 428/480 |

*Primary Examiner*—George F. Lesmes
*Assistant Examiner*—D. R. Zirker
*Attorney, Agent, or Firm*—Gregory N. Clements

[57] ABSTRACT

A two-step, sequential coating method is disclosed which permits the use of aqueous precursor solutions to coat water-insoluble compounds onto thermoplastic film. In a preferred embodiment, an aqueous oleic acid-/ammonium oleate solution is coated onto amorphous polyester sheet which is subsequently monoaxially oriented by stretching in the machine direction, and coated with an aqueous solution of calcium hydroxide, thereby forming a layer of calcium oleate in situ. The coated film is subsequently biaxially oriented by stretching in the transverse direction, and heat-set.

18 Claims, No Drawings

MOISTURE-RESISTANT, COATED THERMOPLASTIC FILM HAVING ENHANCED ADHESION TO INKS AND METALLIC LAYERS

BACKGROUND OF THE INVENTION

The present invention relates to the field of oriented thermoplastic films having utility in packaging and solar control applications. More particularly, the present invention relates to a coated thermoplastic film which is resistant to moisture and which exhibits enhanced adhesion to inks and to metallic coatings deposited onto the film.

Oriented thermoplastic film, particularly biaxially oriented film composed of polyethylene terephthalate (PET), is widely used as a packaging material for a variety of products, including foodstuffs.

Because the surface of oriented PET film is hydrophobic, it is not readily receptive to coating or printing. In many packaging and label applications it is advantageous that the film be receptive to ordinary flexographic and rotogravure printing inks.

In an attempt to remedy this deficiency, special inks have been devised that adhere directly to the surface of PET film. However, many such inks are based on formulations or organic solvents, resinous binders and other ingredients which are costly, difficult to handle and hazardous for use in the manufacturing plant.

Another approach for improving the printability of PET film is to apply a primer coating which adheres to the film and is receptive as well to printing inks applied thereto. Examples of such primer coatings include polymeric compositions based on vinylidene chloride terpolymers such as disclosed in U.S. Pat. No. 2,698,240 or water dispersible copolyester primers such as disclosed in U.S. Pat. No. 4,252,885. The problem with this approach to enhancing ink adhesion to PET film is that the film is in many instances used as a food packaging material and consequently the relative toxicity of the primer layer becomes important. Though polyester film per se is approved as a food packaging material by most Governmental agencies, including the U.S. Food and Drug Administration, polyester film primed with certain polymeric primer coatings such as acrylics, vinylidene chloride-containing polymers and many other similar primers raises toxicity problems because of potential migration of said primer material into foodstuffs with which it is in contact.

Coated polyester films having superior ink adhesion properties are disclosed by U.S. Pat. Nos. 4,486,483 and 4,544,200 to Caines. The non-toxic coatings disclosed therein comprise alkali metal salts of unsaturated fatty acids and alkali metal salts of alkyl sulfates.

In many instances thermoplastic film coated with a metal has replaced metallic foils, such as aluminum foil, for applications such as labels and decals, solar window film, packaging films, decorative products and microfilm. Among other uses, the metallic foils serve to hinder the onset of oxidative rancidity of the products either prepared in or served with certain edible oils by preventing the passage of visible and ultraviolet light. PET, when coated with a thin metallic layer, provides superior oxygen and moisture barrier properties, along with the visible and ultraviolet light barrier properties common to metallic foil packaging applications at a greatly reduced cost. Unfortunately, the metal to film bond can fail in many applications, thereby reducing the performance of the metallized film. One approach for improving the adhesion of the metal to PET film is to heat the coated film as disclosed in British Pat. No. 1,370,893. The drawback to this method is the experimentation which must be performed in order to determine the proper temperature and time elements for this procedure before any metallized film may be produced. Another approach has been to coat polyester film with a layer comprising a random copolymer of ethylene with from 0.5 to 15 weight percent of a 3 to 6 carbon alpha-mono-olefin as disclosed in European Publication No. 0,023,389. Although PET films with this type of coating display a certain improvement in metal adhesion over uncoated PET, they also display an undesirable coating pattern.

A third approach is to coat the polyester film with a copolyester coating which enhances the metal adhesion properties of polyester film. U.S. Pat. No. 4,493,872 to Funderburk teaches a specific sulfonated copolyester coating which provides superior metal adhesive properties to oriented thermoplastic film.

The moisture resistance of the coatings applied to polyester films may be important in applications where the coated film is placed in a relatively humid or moist environment. For example, polyester films employed in food packaging may be exposed to moisture due to condensation from refrigeration and/or high humidity and temperature levels during microwave cooking of the food contained within the packaging. Unfortunately, the non-toxic, ink adhesion coatings disclosed in U.S. Patent No. 4,486,483 do not possess superior resistance to moisture.

Similarly, it is desirable that metalized film possess resistance to moisture, especially in solar control applications where condensation can readily form on the window. Unfortunately, the sulfonated copolyester metal adhesive coating disclosed in U.S. Pat. No. 4,493,872 does not possess superior resistance to moisture.

SUMMARY OF THE INVENTION

The present invention relates to a moisture-resistant coated thermoplastic film comprising
 (i) an oriented thermoplastic film comprising
 (ii) a moisture-resistant coating on at least one side of said film, said coating having been applied to said film by sequentially coating said film with at least two aqueous solutions, one solution containing a precursor A and the other solution containing a precursor B, such that A and B react to form a composition C upon said film which is less water-soluble than either A or B.

In one preferred aspect, the present invention is a moisture-resistant, coated polyester film;
 (i) an oriented polyester film;
 (ii) a primer coating on at least one side of said film comprising an alkaline earth salt of a fatty acid having from 10 to 18 carbon atoms,
said primer coating being present at a weight effective to improve the adhesion of printing inks to said film.

In another preferred aspect, the present invention is a coated polyester film which exhibits resistance to moisture and which is produced by the process comprising
 (i) extruding a substantially amorphous polyester resin in sheet-like form and subsequently cooling said resin to form cast polyester sheet, (ii) coating said sheet with a first aqueous solution comprising at least one fatty acid having from 10 to 18 carbon atoms;

(iii) subsequently orienting said polyester sheet in the longitudinal direction, thereby forming monoaxially oriented polyester film, (iv) coating said monoaxially oriented polyester film with a second aqueous solution containing an alkaline earth hydroxide, (v) subsequently orienting said monoaxially oriented polyester film in the transverse direction thereby forming biaxially oriented polyester film, (vi) heatsetting said biaxially oriented polyester film.

In yet another aspect, the present invention is a process for applying a water-insoluble alkaline earth salt of a fatty acid onto a thermoplastic film comprising (i) coating said film with a first aqueous solution comprising at least one fatty acid having from 10 to 18 carbon atoms;

(ii) subsequently overcoating said aqueous coating with a second aqueous solution containing a water-soluble alkaline earth compound, thereby forming at least one water-insoluble alkaline earth salt of a fatty acid having from 10 to 18 carbon atoms, (iii) removing the water from the film by evaporation to form a water-insoluble alkaline earth salt primer coating upon the web, said primer coating being present at a weight effective to improve the adhesion of printing inks to said film and wherein said film is prepared by melt extruding a substantially amorphous polyester film and thereafter orienting said film by stretching in one or two directions and heat setting said film, said coatings being applied to said film prior to stretching in one direction, or subsequent to stretching in one direction but prior to stretching in a mutually perpendicular direction, or subsequent to stretching but prior to winding the oriented film.

DESCRIPTION OF THE INVENTION

The oriented thermoplastic film which forms a part of the present invention may comprise, but is not limited to, polyester, polyamide, polycarbonate, or polyolefin, such as polyethylene and polypropylene. Oriented polyester film is preferred.

The preferred oriented polyester film for the purposes of this invention is made from polyethylene terephthalate, although the invention is equally applicable to polyester film prepared from the polycondensation of a glycol such as ethylene glycol or butanediol and mixtures thereof with terephthalic acid or mixtures of terephthalic acid and other dicarboxylic acids such as isophthalic acid, diphenic acid and sebacic acid, or their polyester forming equivalents, which polyesters are made by methods well known in the art. The film may be produced by conventional techniques using well known apparatus.

For example, the polyester may be melted and extruded as an amorphous sheet onto a polished revolving casting drum to form a cast sheet of polymer. Thereafter, the film may be axially stretched in one direction, either in the direction of extrusion ("machine direction") or perpendicular to the direction of extrusion (transverse) in the case of monoaxially oriented film. Biaxially oriented film is stretched in both the longitudinal and transverse directions. The first stretching step of the cast sheet may be in either of these two orthogonal directions. The amount of stretching employed to impart strength and toughness to the film can range from about 3.0 to about 5.0 times the original cast sheet dimension in one or both directions. Preferably, the amount of stretching is in the range of between about 3.2 and 4.2 times the original dimension. The stretching operations are carried out at temperatures in the range of from about the second order transition temperature to below the temperature at which the polymer softens and melts.

Where desired, the film is heat treated, after stretching, for a period of time necessary to crystallize the polyester film. Crystallization imparts stability and good tensile properties to the film. When polyethylene terephthalate is heat treated, it is subjected to a temperature in the range of between about 190° C. and 240° C. and, more preferably, in the range from about 215° C. and 235° C.

The present invention provides a sequential coating process in which two aqueous solutions containing water-soluble precursors of the moisture resistant coating composition are sequentially coated on the same surface of an oriented thermoplastic film. As the second aqueous solution is overcoated upon the first aqueous solution, the water-soluble precursors react to form a composition in situ upon the film which is less water soluble than either precursor. The process permits the aqueous coating of a water-insoluble compound upon an oriented thermoplastic film. The advantages of the instant process include the avoidance of potentially hazardous volatile organic solvents and the environmental problems associated with such solvents.

One preferred embodiment of the present invention relates to an oriented polyethylene terephthalate film having a moisture-resistant primer coating applied thereto. The moisture-resistant primer coating comprises the alkaline earth salt of an fatty acid having from 10 to 18 carbon atoms, said primer coating being present at a weight effective to improve the adhesion of printing inks to the polyethylene terephthalate film.

The first of two aqueous solutions used to make an alkaline earth salt of a fatty acid comprises one or more fatty acids having from about 10 to 18 carbon atoms. An aqueous solution of oleic acid is preferred. Additional examples include aqueous solutions of palmitoleic, ricinoleic and petroselinic acids.

A small amount of a weak base may be added to the aqueous fatty acid solution to enhance the solubility of the fatty acid. Ammonium hydroxide is preferred as the weak base. For example, from 3 to 7 weight percent ammonium hydroxide may be conveniently added to a 0.025 mole oleic acid aqueous solution.

The second of two aqueous solutions used to make an alkaline earth salt of a fatty acid comprises one or more Group II hydroxides. An aqueous solution of calcium hydroxide is especially preferred. Once both aqueous solutions are applied to the oriented thermoplastic film, the resultant coating formed in-situ by both aqueous solutions is an alkaline earth metal salt of a fatty acid having 10 to 18 carbon atoms.

The aqueous coating solutions of the present invention may be applied to the oriented thermoplastic film by any of the well known coating techniques employed in the film manufacturing arts. For example, coating may be effected by roller coating, spray coating, slot coating or immersion coating. In a preferred embodiment, the polyester film is coated by means of gravure roller coating. Also, the polyester film surface is preferably subjected to a corona discharge by a corona discharge apparatus prior to coating as is disclosed in U.S. Pat. Nos. 3,520,959; 3,820,929; and 4,028,032. The discharge treatment decreases the hydrophobic character of the polyester film surface, which permits the water-based coating to more easily wet the surface and thus improve the adhesion of the coating to the film surface.

The sequential coating process of the present invention may be performed prior to any orientation of the film web ("pre-draw"), between the first and second orientation stretching steps ("inter-draw"), after orientation has been completed ("post draw") or a combination of pre-draw, interdraw and/or post-draw coating procedures may be employed. Pre-draw coating of the film web with the ammonium salt solution followed by interdraw coating with the alkaline earth compound is preferred.

The quantities of the water-soluble precursors sequentially deposited upon the film surface are dependent upon their coating solution concentration and coating application rate. Either stoichiometric amounts of the water-soluble precursors or an excess of either precursor may be deposited onto the film surface.

The preferred concentrations of the water-soluble precursors should be adjusted so as to yield a final dry "composite" coating weight of about $1 \times 10^{-8}$ to $2 \times 10^{-5}$ lbs per square foot of film surface. Preferably, the dry "composite" coating weight range is from about $2 \times 10^{-7}$ to $7 \times 10^{-6}$ lbs per square foot, with $8 \times 10^{-7}$ lbs per square foot being the target weight of the moisture resistant coating.

The sequential coating process of the present invention does not require that the first coating be dried prior to application of the second coating. However, contamination of the second solution by the first coating solution may occur if the first coating is not substantially dry before the second coating is applied. When drying is desired the necessary heat may often be supplied by appropriate adjustment of the orientation process parameters. Alternatively, forced air, infrared heating or a combination of these methods may be optionally employed to dry the coating.

In the preferred embodiment the first coating solution is applied to the forward drawn polyester sheet, and is dried by conventional means before the second coating solution is applied. Drying of the second coating is accomplished during the transverse orientation of the film.

A major application of the moisture-resistant film of the preferred embodiment of this invention is as a packaging or label material. The primed polyester films exhibit superior adhesion to aqueous and organic solvent-based flexographic and rotogravure printing inks in comparison to unprimed polyester film. The instant films exhibit superior moisture resistance and equivalent ink adhesion when compared to the non-toxic primer coatings disclosed in U.S. Pat. No. 4,486,483.

Polyester films which have been primed with the alkaline earth salt primer coating of the present invention also possess excellent utility as a base for the production of metallized films.

Metallized films can be prepared by forming a coating on a surface of the coated polyester film by directing a stream of metal vapor or atoms onto the surface of the film by a vacuum deposition technique. This can be achieved by heating the metal in a high vacuum, preferably in the range of about $10^{-3}$ to about $10^{-5}$ torr, to a temperature above its melting point such that the vapor pressure of the metal exceeds about $10^{-2}$ torr. Alternatively, the metal to be deposited can be subjected to a stream of bombarding ions whereby the metal is removed by mass transfer "sputtering", in which metallic atoms or vapors are emitted in all directions. These vapors or atoms impinge on the film surface, condense and thereby form a thin metallic coating on the film. Mass transfer sputtering coating techniques can be applied to zinc, nickel, silver, copper, gold, indium, tin, stainless steel, chromium, titanium and, most preferably, aluminum, and include also the oxides of such metals. The thickness of the applied metal coating is a matter of preference depending upon the final use of the metallized film. Aluminum coatings in packaging applications may range from about 300 to 600 angstroms, while aluminum coatings in solar applications are generally less than 100 angstroms in thickness.

EXAMPLES

The following Examples illustrate the practice and advantages of specific embodiments of the present invention. In no event should these specie embodiments of the generic invention be construed as limiting the scope of the claims.

EXAMPLE I

Manufacture of Polyester Film Primed With Calcium Oleate

This Example illustrates that the order of coating the aqueous precursor solutions onto the film web is not important (assuming, of course, that the solubilities of the solutes is not an issue). Two polyester film samples were each prepared by sequentially applying the two precursor solutions without a drying step between the coatings. In the first sample run, an aqueous solution of oleic acid/ammonium oleate (0.025 moles/liter) was coated on the PET film and subsequently overcoated with an aqueous solution of calcium hydroxide (0.025 moles/liter). The coating sequence was reversed for the second film sample: calcium hydroxide (0.025 moles/liter) was overcoated with oleic acid/ammonium oleate (0.025 m/l).

The preparation of these calcium oleate coated films is summarized below:

Polyethylene terephthalate polymer was melted and extruded through a slot die onto a casting drum maintained at a temperature of about 20° C. The melt froze to form a cast polyester sheet. The cast polyester sheet was longitudinally stretched at a draw ratio of approximately 3.5:1 while being maintained at a temperature of about 80° C.

The uniaxially oriented polyester film was then electric corona discharge treated on both sides of the film at prior to being sequentially coated as described above.

The coated film was then stretched in the transverse direction at a draw ratio of 3.9:1 to produce a biaxially oriented film, which was then heat set at a maximum temperature of 230° C.

The oleic acid/ammonium oleate solution was prepared by adding from 3 to 7 weight percent ammonium hydroxide (based on the weight of the oleic acid) to a 0.025 mole aqueous solution of oleic acid.

There was considerable contamination of the coating solution in the second coater by the first coating solution, which led to the precipitation of calcium oleate in the coating roll of the second coater.

EXAMPLE II

Evaluation of Ink Adhesion

Samples of the two calcium oleate primer-coated polyester films of Example I were evaluated for ink adhesion using eight different ink systems. The ink adhesion tests were conducted by applying the inks to cut pieces of the film samples by a draw down technique using a No. 6 Meyer rod, followed by oven drying of the ink at 140° F. for a least one minute. A strip of adhesive tape (Scotch brand No. 610) was adhered to the dried inked surface, rubbed with the finger to insure intimate contact, and then rapidly pulled away from the film. The amount of ink remaining in the area which was under the tape is expressed as a percentage of the area, ie., no ink removed equals 100% adhesion; all ink removed equals 0% adhesion, with intermediate adhesion values being assessed in terms of the proportion of ink remaining adhered to the film.

Results of the adhesion tests are compared to an unprimed PET control film in Table I below:

TABLE I

| | | | Ink Adhesion | | | | | |
|---|---|---|---|---|---|---|---|---|
| | | | CZ FMB | | CONVERTER's MYLEX | | GPI SUNESTER | |
| Sample | Green Marker | Blue Spray | Red | White/Red | Blue | White/Blue | Blue | White/Blue |
| 1 | 98% | 100% | 96% | 96% | 99% | 98% | 99% | 97% |
| 2 | 98% | 100% | 96% | 98% | 99% | 97% | 100% | 99% |
| Control A | 99%* | | 100%* | 100%* | | | 100%* | 100%* |
| Control B | 98%* | | 95%* | 98%* | | | 100%* | 100%* |

Legend:
Control A is a primed polyester film commercially available from Hoechst Celanese Corporation under the trademark HOSTAPHAN ® 2600.
Control B is a primed polyester film commercially available from Hoechst Celanese Corporation under the trademark HOSTAPHAN ® 2500.
*This data was not generated at the time Example I was performed; rather, they are data which has been collected at other times but under similar laboratory conditions.

EXAMPLE III

Metal Adhesion

Samples of two calcium oleate coated polyester films produced in Example I were evaluated for metal adhesion by placing the samples of the one-side coated film thus produced in a twelve inch laboratory vacuum coater. The vacuum chamber was evacuated to less than $10^{-4}$ torr pressure and approximately 500 Angstoms of aluminum was evaporated onto the coated film sample surface from a tungsten filament.

Within 30 minutes after removal from the vacuum chamber, each sample surface was tested for metal "rub-off" by lightly rubbing the metal surface with a cotton swab using the same number of rubs and approximately the same pressure for each sample tested. The samples were further evaluated by rubbing a pencil eraser across the surface of the film. A third evaluation was performed by laminating an ethylene vinyl acetate film to the metallized PET, subsequently delaminating the two films, and estimating the amount of metal removed from the PET film as a result of delamination.

Results of the metal adhesion tests are set forth in Table II below:

TABLE II

| | Metal Adhesion | | |
|---|---|---|---|
| Sample | Cotton Swab | Eraser Rub | EVA lamination/Delamination |
| 1 | Excellent | Excellent | Excellent |
| 2 | Good | Excellent | Excellent |
| Control A | Excellent* | | Excellent* |
| Control B | Excellent* | | Good* |

Legend:
"Excellent" means that visual observation could not detect that any metal was removed from the film sample surface.
"Good" means that a small amount of metal was visually observed as having been removed from the film sample surface.
"Fair" means that a considerable amount of metal was visually observed as having been removed from the film sample surface.
Control A is a primed polyester film commercially available from Hoechst Celanese Corporation under the trademark HOSTAPHAN ® 2600.
Control B is a primed polyester film commercially available from Hoechst Celanese Corporation under the trademark HOSTAPHAN ® 2500.
*This data was not generated at the time Example II was performed; rather, they are data which has been collected at other times but under similar laboratory conditions.

EXAMPLE IV

Moisture Resistance

Moisture resistance is evaluated by heat sealing one end of a one inch wide strip of the test film sample to a one inch wide strip of ethylene vinyl acetate film using a Sentinel heat sealer operated at 350° F., 1.5 seconds dwell, and 40 psi pressure. The test/EVA strip is then vertically hung under a 48 gram load in an environmental oven maintained at 100° F. and 80% relative humidity. The time to heat seal failure is an indication of the resistance to moisture of the test film.

Samples of the two calcium oleate primer-coated polyester films were evaluated for moisture resistance together with samples of three other polyester films. Test results and descriptions of the three other film samples are set forth in Table III.

TABLE III

| | Moisture Resistance |
|---|---|
| Sample | Elapsed Time (seconds) |
| 2 | 399 |
| 1 | 377 |
| Control A | 257 |
| Control B | 139 |

Legend:
Control A is a primed polyester film commercially available from Hoechst Celanese Corporation under the trademark HOSTAPHAN ® 2600.
Control B is a primed polyester film commercially available from Hoechst Celanese Corporation under the trademark HOSTAPHAN ® 2500.

EXAMPLE V

Two samples of calcium oleate coated polyester film were produced according to the process set forth in Example I, except that the conventional reverse gravure coating of the second coater was modified to a "direct" gravure coater in which the coating roll rotated in the direction of travel of the web instead of against the direction of film travel. The alteration of the second coating application did not eliminate the contamination problem experienced in Example I.

Samples of the calcium oleate primed polyester film prepared in Example V were evaluated for ink adhesion and metal adhesion. Test results are set forth in Tables IV and V.

TABLE IV

| | Ink Adhesion | | | |
|---|---|---|---|---|
| Sample | Green Marker | CZ FMB Red | INMONT 841 Blue | GPI SUNESTER Blue |
| 3 | 100% | 95% | 100% | 90% |
| 4 | 100% | 100% | 100% | 90% |
| Control A | | 100% | 100% | 100% |

Legend:
Control A is a primed polyester film commercially available from Hoechst Celanese Corporation under the trademark HOSTAPHAN ® 2600.

TABLE V

| | Metal Adhesion | | |
|---|---|---|---|
| Sample | Cotton Swab | Eraser Rub | EVA Lamination/Delamination |
| 3 | good | fair | good |
| 4 | good | fair | good |
| Control A | Excellent | Excellent | Excellent |
| Control B | Excellent | Excellent | Good |
| Control C | Fair | Fair | Fair |

Legend:
"Excellent" means that visual observation could not detect that any metal was removed from the film sample surface.
"Good" means that a small amount of metal was visually observed as having been removed from the film sample surface.
"Fair" means that a considerable amount of metal was visually observed as having been removed from the film sample surface.
Control A is a primed polyester film commercially available from Hoechst Celanese Corporation under the trademark HOSTAPHAN ® 2600.
Control B is a primed polyester film commercially available from Hoechst Celanese Corporation under the trademark HOSTAPHAN ® 2500.
Control C is an unprimed polyester film commercially available from Hoechst Celanese Corporation under the trademark HOSTAPHAN ® 2400.

EXAMPLE VI

Manufacture of Polyester Film Primed With Calcium Oleate

Three samples of calcium oleate coated film were prepared according to the procedure summarized below. The first film sample was not corona treated; the second film sample was corona treated on the coated side only at a power level of 2.8 watts min/ft$^2$; and the third film sample was corona treated on both sides at a power level of 2.8 watt min/ft$^2$ per side.

In addition to the three calcium oleate coated films, two control sample films were also prepared. Sample VID film was coated only with oleic acid/ammonium oleate, while Sample VIE was coated only with calcium hydroxide.

Polyethylene terephthalate polymer was melted and extruded through a slot die onto a casting drum maintained at a temperature of about 20° C. The melt froze to form a cast polyester sheet. The cast polyester sheet was longitudinally stretched at a draw ratio of approximately 3.5:1 while being maintained at a temperature of about 80° C.

Prior to longitudinal stretching the polyester cast sheet was electric corona treated as described above and then coated with an aqueous 0.0875 mol solution of oleic acid/ammonium oleate.

The coated, longitudinally drawn polyester was subsequently overcoated with a 0.025 mol solution of calcium hydroxide. The overcoated film was dried at a temperature of about 100° C. Thereafter, the film was stretched in the transverse direction at a draw ratio of 3.9:1 to produce a biaxially drawn film. The biaxially drawn film was heat set at a maximum temperature of 230° C. The dry weight of the coating was about $1.625 \times 10^{-3}$ lbs per 1,000 square foot of film, with an excess ($2.9 \times 10^{-4}$ lb/1000 square feet) of calcium hydroxide on the film. The thickness of the base PET film was about 0.48 mil.

It should be noted that since the first coating is applied prior to the cast polyester sheet being forward drawn at a ratio of 3.5 to 1, the concentration of the first coating must be 3.5 times greater than the concentration of the second coating to obtain an equal concentration/unit area of finished film assuming the same wet laydown.

Samples of these films were evaluated for metal and ink adhesion by following the procedures set forth above. Tests results are recited in Table VI and VII:

TABLE VI

| | Metal Adhesion | | |
|---|---|---|---|
| Film | Cotton Swab | Eraser Rub | EVA Lamination/Delamination |
| Control B | Poor | Poor | Good |
| VI(A) | Fair | Poor | Poor |
| VI(B) | Good | Fair | Good |
| VI(C) | Good | Fair | Good |
| VI(D) (oleic acid) | Good | Fair | not performed |
| VI(E) [Ca(OH)$_2$] | Good | Fair | not performed |

Legend:
Control B is a primed polyester film commercially available from Hoechst Celanese Corporation under the trademark HOSTAPHAN ® 2500.
"Excellent" means that visual observation could not detect that any metal was removed from the film sample surface.
"Good" means that a small amount of metal was visually observed as having been removed from the film sample surface.
"Fair" means that a considerable amount of metal was visually observed as having been removed from the film sample surface.
"Poor" means that all or almost all of the metal was visually observed as having been removed from the film sample surface.

TABLE VII

| | Ink Adhesion | | | |
|---|---|---|---|---|
| FILM | GREEN MARKER | GPI SUNESTER BLUE | INMONT 841 BLUE | CZ-FMB RED |
| Control A | not performed | 100% | 100% | 100% |
| VI(A) | 100% | 100% | 100% | 100% |
| VI(B) | 100% | 100% | 100% | 100% |
| VI(C) | 100% | 100% | 100% | 100% |
| VI(D) (oleic acid) | 30% | 0% | 95% | 70% |
| VI(E) [Ca(OH)$_2$] | 30% | 95% | 100% | 95% |

Legend:
Control A is a primed polyester film commercially available from Hoechst Celanese Corporation under the trademark HOSTAPHAN ® 2600.

EXAMPLE VII

Pre-Draw/Inter-Draw Sequential Coating Evaluation

Three samples of calcium oleate primed polyester film were prepared according to the following procedure:

Polyethylene terephthalate polymer was melted and extruded through a slot die onto a revolving casting drum maintained at a temperature of about 20° C. The molten polymer froze to form a cast polyester sheet and was subsequently coated with an aqueous solution of oleic acid/ammonium oleate and dried prior to being longitudinally stretched at a draw ratio of approximately 3.5:1 while being maintained at a temperature of about 80° C.

The uniaxially oriented, ammonium-oleate-coated film was surface treated by means of an electric corona discharge prior to being coated with a 0.1% by weight aqueous solution of calcium hydroxide. The coated film was then dried and stretched in the transverse direction at a draw ratio of approximately 3.9:1 to produce a biaxially-oriented film, which was then heat-set at a maximum temperature of about 230° C.

The three polyester films prepared as summarized above differed in the concentration of the ammonium oleate aqueous solution. The three film samples were evaluated for ink adhesion and metal adhesion according to the experimental procedures recited above. Moisture sensitivity was evaluated by making a heat seal of the test film to EVA film (using a Sentinel sealer, 350° F., 1.5 sec. dwell, 40 psi). The 1" wide strip is hung under tension (48 g) in an environment oven (100° F., 80% RH). The time elapsed before the seal failed is recorded. Results are set forth in the following tables:

TABLE VIII

| | Metal Adhesion | | |
|---|---|---|---|
| Sample | Cotton Swab | Eraser Rub | EVA Lamination/Delamination |
| VII (A) | Excellent | Excellent | Excellent |
| VII (B) | Excellent | Excellent | Excellent |
| VII (C) | Excellent | Excellent | Excellent |
| Control A | Excellent | Excellent | Excellent |

Legend:
Control A is a primed polyester film commercially available from Hoechst Celanese Corporation under the trademark HOSTAPHAN ® 2600.
"Excellent" means that visual observation could not detect that any metal was removed from the film sample surface.
"Good" means that a small amount of metal was visually observed as having been removed from the film sample surface.
"Fair" means that a considerable amount of metal was visually observed as having been removed from the film sample surface.

TABLE IX

| | INK ADHESION | |
|---|---|---|
| Sample | CZ-FMB Red | INMONT 841 Blue |
| VII (A) | 60% | 100% |
| VII (B) | 60% | 100% |
| VII (C) | 50% | 100% |
| Control A | 100% | 100% |

Legend:
Control A is a primed polyester film commercially available from Hoechst Celanese Corporation under the trademark HOSTAPHAN ® 2600.

TABLE X

| | Moisture Resistance |
|---|---|
| Sample | Elasped Time (seconds) |
| VII (C) | 310 |
| VII (B) | 250 |
| VII (A) | 230 |
| Control A | 170 |
| Control B | 70 |
| Control C | 45 |
| VII (C) | 385 |
| VII (A) | 260 |
| Control A | 190 |
| VII (B) | 180 |
| Control B | 115 |
| Control C | 65 |
| VII (A) | 240 |
| VII (C) | 230 |
| VII (B) | 200 |
| Control A | 180 |
| Control B | 150 |

TABLE X-continued

| | Moisture Resistance |
|---|---|
| Sample | Elasped Time (seconds) |
| Control C | 130 |

We claim:
1. A moisture-resistant, coated thermoplastic film comprising:
   (i) an oriented thermoplastic film; and
   (ii) a moisture-resistant coating on at least one side of said film, said coating having been applied to said film by sequentially coating said film with at least two aqueous solutions, one of which contains a precursor A and the other solution containing precursor B, such that A and B react to form at least one alkaline earth salt of a fatty acid having 10 to 18 carbon atoms upon said film which is less water-soluble than either A or B.

2. The film of claim 1, wherein said film is an oriented polyester film and said coating is present in an amount effective to improve the adhesion of printing inks to said film.

3. The film of claim 2 wherein said oriented polyester film is biaxially oriented polyethylene terephthalate.

4. The film of claim 2 wherein said coating has a dry coating weight of from about $1 \times 10^{-8}$ to about $2 \times 10^{-5}$ lbs per square foot of film surface.

5. The film of claim 4 wherein said dry coating weight is from about $2 \times 10^{-7}$ to $7 \times 10^{-6}$ lbs per square foot of film surface.

6. The film of claim 4 wherein said coating comprises an alkaline earth salt of oleic acid.

7. The film of claim 6 wherein said coating comprises calcium oleate.

8. The film of claim 7 having a printing ink composition applied directly to said coating.

9. The film of claim 7 having a metallic layer directly applied to said coating, said metallic layer comprising a metal selected from the group consisting of aluminum, chromium, copper, gold, indium, nickel, silver, stainless steel, tin, titanium, and zinc.

10. The film of claim 9 wherein said metallic layer comprises aluminum.

11. The film of claim 9 wherein said metallic layer is applied to said coating by a vacuum deposition technique.

12. A moisture-resistant, coated polyester film produced by the process comprising
   (i) extruding a substantially amorphous polyester resin in sheet-like form and subsequently cooling said resin to form cast polyester sheet,
   (ii) coating said sheet with a first aqueous solution containing a fatty acid having from 10 to 18 carbon atoms;
   (iii) subsequently orienting said polyester sheet in the longitudinal direction, thereby forming monoaxially oriented polyester film, p1 (iv) coating said monoaxially oriented polyester film with a second aqueous solution containing an alkaline earth hydroxide, p1 (v) subsequently orienting said monoaxially oriented polyester film in the transverse direction, thereby forming biaxially oriented polyester film,
   (vi) heatsetting said biaxially oriented coated polyester film.

13. The film of claim 12 wherein said first aqueous solution comprises oleic acid and said second aqueous solution comprises calcium hydroxide.

14. The film of claim 13 having a printing ink composition applied directly to said coated polyester film.

15. The film of claim 13 having a metallic layer directly applied to the coated side of said film, said metallic layer comprising at least one metal selected from the group consisting of aluminum, chromium, copper, gold, indium, nickel, silver, stainless steel, tin, titanium, and zinc.

16. The film of claim 12 wherein said first aqueous solution is substantially dried on the surface of said polyester sheet prior to orienting said polyester sheet.

17. The film of claim 16 wherein said second aqueous solution is substantially dried on the surface of said monoaxially oriented polyester film prior to orienting said monoaxially oriented polyester film.

18. The film of claim 13 wherein said first aqueous solution additionally contains from 3 to 7 weight percent ammonium hydroxide, based upon the weight of oleic acid present in said aqueous solution.

* * * * *